United States Patent Office 3,224,713
Patented Dec. 21, 1965

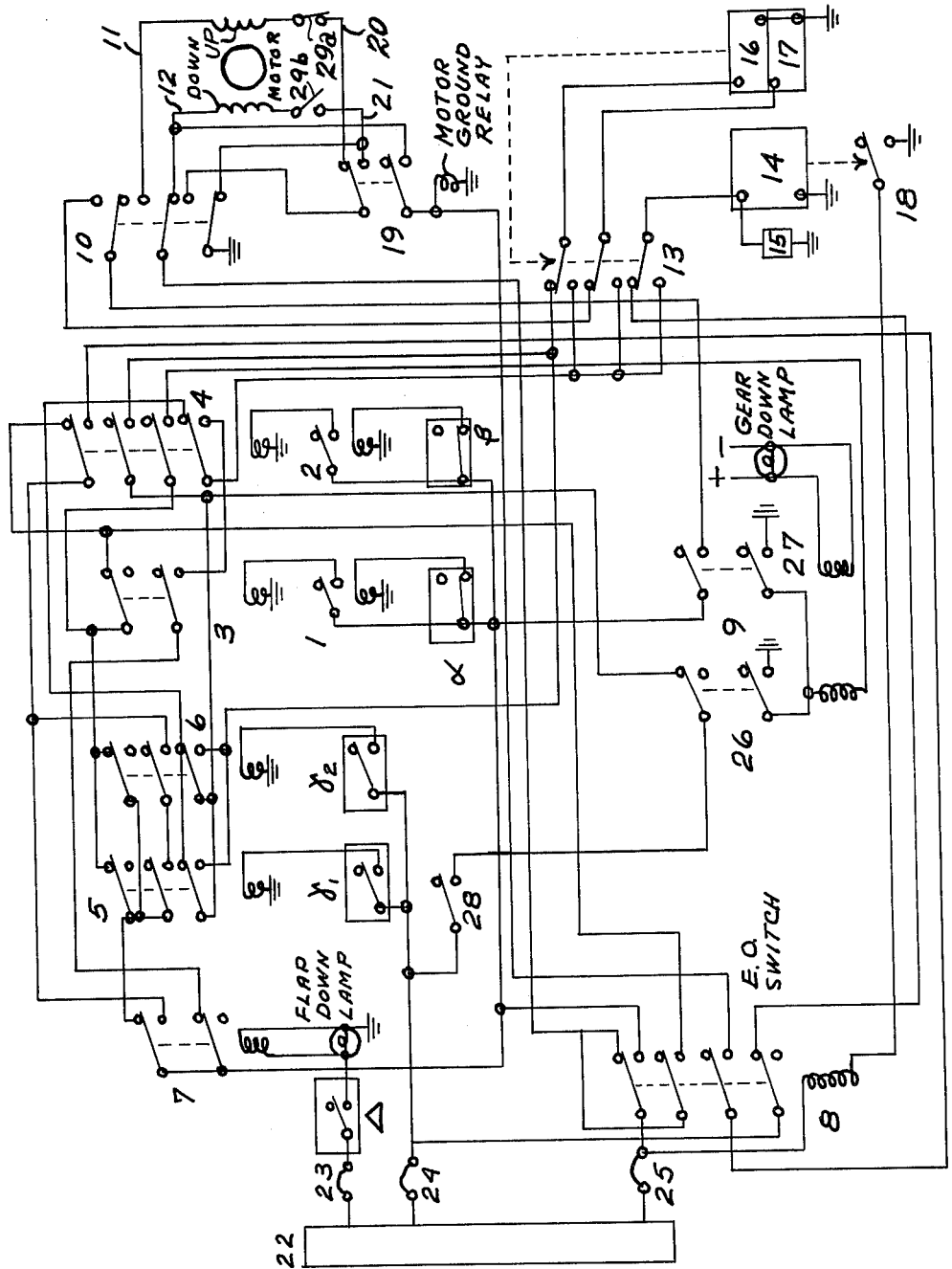

3,224,713
LANDING GEAR SYSTEM
James C. Pope, 441 Dulles Road, Des Plaines, Ill. 60016
Filed June 8, 1964, Ser. No. 373,401
6 Claims. (Cl. 244—102)

This invention relates to a landing gear system and, more particularly, to an improved integrated sensing, warning and automatic control system designed to prevent undesired gear-up situations when installed in any type of aircraft or spacecraft employing a retractable landing gear mechanism.

This application is a continuation-in-part of my copending applications Serial Numbers 312,650, filed on Sept. 30, 1963, and 339,286, filed on Jan. 21, 1964.

With the advent of the retractable landing gear mechanism for the purpose of reducing total aerodynamic drag on an aircraft, the significant potential hazard of unintentional gear-up accidents has developed. Included in this general category of accidents are gear-up landings, incidents which result from premature gear retraction after takeoff allowing the aircraft to settle back on the runway, and situations where the gear is inadvertently raised while the aircraft is on the ground by mistakenly raising the gear switch.

Despite the implementation of check lists, warning horns or lights, gear safety switches, latching locks, and a myriad of other devices including gear position switch arrangement variations, the fallibility for occasional error or forgetfulness results in frequent gear-up accidents involving almost every make of aircraft used in private, commercial, and military operations.

It is a principal object of the invention to provide a Gear Up Automatic Response Device (hereinafter referred to as GUARD which may be selectively employed to monitor and control the operation of a retractable landing gear mechanism to prevent inadvertent retraction of the landing gear.

Ancillary to the immediately preceding object, it is a further object of the invention to provide warning devices to indicate to the pilot that although the craft is on the ground, the pilot-controlled gear selector switch is in the up position.

A further object of the invention is to provide a GUARD to prevent retraction of the landing gear until such time as the craft is self-sustaining in flight attitude.

An additional object of the invention is to provide a GUARD to initiate unmistakable gear-up signals to warn the pilot when a condition calling for possible extension of the landing gear is indicated.

A still further object of the invention is to provide a GUARD to monitor flight characteristics to automatically extend the landing gear under certain conditions.

Another object of the invention is to provide a GUARD which in no way impairs normal safe cockpit procedures, but rather is one which effectively serves as an automatic landing gear system to eliminate the possibility of an aircraft being on the ground with the landing gear retracted.

Further objects and the entire scope of the invention will become more fully apparent when considered in light of the following detailed description of an illustrative embodiment of the invention and from the appended claims.

The illustrative embodiment of the invention may be best understood by reference to the accompanying drawing which is a schematic electrical diagram of a preferred embodiment of the invention.

Briefly, the invention comprises control circuitry associated with suitable primary and secondary sensing units which monitor parameters indicative of the flight characteristics of the aircraft or spacecraft. When the landing gear is extended, these sensing units determine whether the craft is in proper flight attitude to permit retraction of the gear. In flight, the sensing units control the automatic extension of the gear from a retracted position when it appears that the craft is about to land. In spite of the fact that the system of the invention is designed to perform automatic functions, provisions are included to selectively disable the system to allow the pilot to have normal manual control of the landing gear system.

While the system is intended for use on any aircraft or spacecraft having retractable landing gear mechanisms, the following description of operation will be referenced to present day aircraft. More particularly, the described system is one which may be employed on a conventional twin-engine airplane, although by obvious modifications, the system may be adapted to single-engine aircraft or to multi-engine craft having more than two engines.

Before entering into a discussion of the operation of the system, the individual components illustrated in the drawing will briefly be described. The first of the primary sensing units is a primary gear-retract (gear-up) sensing unit Alpha, hereinafter designated $\alpha$, which utilizes a differential pressure actuator switch (transducer) which closes below approximately $1.1V_s$ ($V_s$ being the stalling speed of an aircraft with gear and flaps retracted). However, other types of units may be employed such as a proximity device (e.g. a radio altimeter or absolute altitude indicator) closed below some predetermined height above the ground, and/or an angle of attack sensor in parallel with the other sensing units.

The second primary sensing unit is a gear-extend (gear-down) sensing unit Beta, hereinafter designated as $\beta$, which also utilizes a differential pressure switch but which employs a critical level of approximately $1.5V_s$. A proximity device may also be used for the $\beta$ sensing unit, the critical altitude being a height greater than that selected for the $\alpha$ unit.

The first of the secondary sensing units comprises a pair of gear-extend-retract sensing units $Gamma_1$ and $Gamma_2$, hereinafter referred to as $\gamma_1$ and $\gamma_2$, which in the described embodiment are single pole-double throw, pressure actuated switches closed to the down position by a preset engine manifold pressure of approximately 14 inches of mercury. However, the following types of units are also applicable to the GUARD system described:

(a) A double pole-double throw microswitch activated to the closed position by throttle lever movement below an engine power manifold pressure corresponding to approximately 14 inches of mercury.

(b) A single pole-double throw switch actuated by a predetermined angular relationship (rotational angle) between a variable VTOL (vertical takeoff and landing) or STOL (short takeoff and landing) vehicle power plant (or air flow detecting vanes) and the horizontal surface of the ground below.

The second of the secondary sensing units is a gear-extend-retract sensing unit Delta, hereinafter referred to as $\Delta$, which utilizes a switch actuated by a predetermined flap position (usually fully extended). Another type of unit which may be employed responds to a predetermined propeller pitch lever position (usually full in, or low pitch).

Although the foregoing sensing units are typical of the type which may be employed, it is obvious that other arrangements for satisfactorily monitoring pertinent flight characteristics, or parameters, may be substituted therefor.

The $\alpha$ relay and its associated switch, which is of the single pole-double throw type, is generally indicated at 1. The α relay is energized when the α sensing unit is closed.

The numeral 2 indicates the β relay and its associated switch, the β relay being energized when the β sensing unit is closed. The α and β relays are time delay relays utilized to prevent pulsating electrical shock load to the gear system.

A gear-retracted relay and associated switch is designated as 3. The gear-retract relay is energized on closing of switch 1 in response to closing of the α sensing unit. The gear-retract switch is of the double pole-double throw type.

A gear-extend relay and its associated four pole-double throw switch is indicated at 4. Relay 4 is energized to actuate its associated switch on closing of switch 2 in response to closing of the β sensing unit.

The $\gamma_1$ and $\gamma_2$ relays and their associated switches are indicated at 5 and 6, respectively. These switches are each of the triple pole-double throw variety and are closed when their associated relays are energized due to the closing of the respective $\gamma_1$ and $\gamma_2$ sensing units. The $\gamma_1$ unit is operatively associated with one of the engines, and the $\gamma_2$ unit is operatively related to the second engine.

The Δ relay and its associated switch have been designated as 7, the Δ relay being energized to close its associated double pole-double throw switch on closing of the Δ sensing unit.

An Off-On relay 8 is operatively related with an associated Emergency Override switch (hereinafter called the E.O. switch). The latter is a four pole-double throw switch.

Two double pole-double throw relay switches 26 and 27 act as a sequence system 9 with switch 26 being in the gear-up warning circuit and switch 27 being in the gear down-switch up circuit.

A pilot-operated gear selector switch 10 is employed to permit retraction and extension of the landing gear. This switch is a manually operated switch of the triple pole-double throw type.

To one of the contacts of switch 10, the Up winding power line 11 of the motor is connected. The Down winding power line 12 of the motor is connected to another of the contacts of switch 10.

In order to permit testing of the unit to determine whether it is operable, a press-to-test switch 13 is provided. This switch is of the triple pole-double throw type. One of the poles of this switch is connected to a power-off lamp 14 and a warning horn 15 in parallel therewith. The remaining two poles of switch 13 are connected respectively to a gear-up lamp 16 and a gear selector switch-up lamp 17.

To permit the GUARD system to be selectively unabled and disabled, a GUARD system Off-On switch 18 is provided. This switch controls the energization of the On-Off relay 8.

A motor ground relay and its associated switch is designated as 19, the switch being of the double pole-double throw type. To one of the contacts of the switch 19, the Up winding ground line 20 from the motor is connected. The Down winding ground line 21 from the motor is connected from another of the contacts of switch 19.

Power to the system is supplied through a bus bar 22. The power lines from the bus bar to the GUARD system each employ circuit breakers. These breakers are designated as 23 through 25.

In addition to the above-described elements, the GUARD system also contains a mechanical gear-up switch 28 which closes when the gear is in the retracted position. A mechanical switch 29a is provided in the Up-winding circuit of the motor to open when the gear is fully retracted, and a similar switch 29b is provided in the Down-winding circuit to open when the gear is fully extended. A suitable gear-down lamp and a flap-down lamp are also included in the system.

Before a detailed description of the operation is set forth, a functional outline will be presented. It will be assumed that initially with the aircraft at rest, the aircraft's master electrical switch (not shown) is open preventing bus bar 22 from being energized. Under this condition, the positions of each of the switches of the GUARD system are as indicated in the drawing. On energization of bus bar 22 caused by closing the master switch, relays 1 and 2 are energized to close their associated switches thereby energizing relays 3 and 4 to in turn close their respective switches. Since switch 18 is open, relay 8 is not energized resulting in the E.O. switch remaining in the illustrated position. To indicate that the E.O. switch is open (and that the Guard system is therefore inoperative), power is supplied to the power-off lamp 14 and the warning horn 15 in parallel therewith. To activate the GUARD system, switch 18 is closed to energize relay 8 thereby closing the E.O. switch to break the current path to lamp 14 and horn 15. Under these conditions a path is completed to the press-to-test switch 13. At this time, the pilot may actuate switch 13 to complete circuits to lamps 14, 16 and 17 and to horn 15. Operation of elements 14 through 17 indicates that the GUARD system is operative.

When the engines are started, sensing units $\gamma_1$ and $\gamma_2$ close to energize relays 5 and 6, respectively, thereby closing their associated switches. Should the pilot-operated gear selector switch 10 be inadvertently thrown to the up position, a circuit is thereby completed through switch 10 to lamp 17 to indicate that the selector switch is up while the landing gear is down. During this time power is also applied to the motor ground relay 19 to close its associated switch thereby isolating the Up winding ground line 20 from ground to prevent accidental energization of the Up winding of the motor.

As the aircraft is accelerated to takeoff, the secondary sensing units $\gamma_1$ and $\gamma_2$ open to de-energize relays 5 and 6 thereby opening their associated switches to the positions shown in the drawing. This operation breaks the motor ground relay circuit allowing its associated switch 19 to assume the position shown. When the speed of 1.1 $V_s$ is reached, the primary sensing unit α opens to cause de-energization of the gear retract relay 3 and its associated switch is thereby opened. A circuit is thereby completed to the selector switch 10 and the press-to-test circuit is broken. A gear-up operation may then be performed by throwing switch 10 to the up position. When the gear is completely retracted, switch 29a opens to disrupt the power circuit to the Up winding and coil 27 is de-energized when gear starts up. However, relay 26 at this time is energized to maintain its associated switch closed. Therefore, when switch 28 closes to complete an alternate press-to-test circuit, the circuit to the gear-up lamp 16 remains open. On reaching a speed of 1.5$V_s$, the primary sensing unit β opens to cause release of switch 4 thereby opening the circuit to relay 26, thereby preparing the gear-up warning circuit for subsequent operation.

When power is cut back to reduce the manifold pressure below 14 inches of mercury, as in the power-off landing operation, the secondary sensing units $\gamma_1$ and $\gamma_2$ close to cause switches 5 and 6 to also close. This completes a circuit to the gear-up lamp 16 indicating to the pilot the condition of the gear. If the air speed drops below 1.5$V_s$, sensing unit β closes to cause switch 4 to close providing another circuit to the gear-up lamp. Thus, when either or both of these conditions are present, lamp 16 is energized. When both the air speed and manifold pressures are reduced as just described, the motor ground relay circuit is completed to close switch 19. This completes a current path through the down winding 12 so that if switch 10 is still in the Up position, the motor Down winding is energized to automatically allow the gear to extend. As the gear extends, switch 28 opens to extinguish the gear-up lamp 16 and switch 29a closes to ready the system for a subsequent gear-up operation. When the gear is fully down, switch 29b opens and relay coil 27 is energized to actuate its associated switch to complete a circuit to the gear-down switch-up lamp 17.

The gear can be extended at any time prior to the condition where the $\beta$ and the $\gamma_1$ and $\gamma_2$ sensing units are closed by appropriately actuating the gear selector switch 10. If switch 10 is thrown to the down position after the automatic operation commences, no adverse effect is encountered and this operation simply breaks the circuit to the gear-down switch-up lamp 17.

Under the condition where the power is on during the landing operation, the secondary sensing device $\Delta$ assumes importance. When power is on, lowering of the flaps results in actuation of flap switch 7 to effect by-passing of switches 5 and 6 thereby insuring automatic extension of the gear as previously described.

To prevent inadvertent gear-up operation during landing roll-out, at which time the speed of the aircraft may be greater than $1.1V_s$ but less than $1.5V_s$, the motor ground relay 19 remains energized to preclude grounding of the line 20, thereby preventing power from being supplied to the Up winding. When the aircraft slows to less than $1.1V_s$, switch 3 is closed to further insure that no current will be supplied to the selector switch 10 which might permit the energization of the Up winding.

It should be noted that the E.O. switch may be opened at any time by opening switch 18. This supplies power directly to the pilot selector switch to facilitate manual operation of the landing gear.

Now that the functional description has been set forth, the details of operation will be set forth.

Rest

With voltage supplied to bus bar 22, the GUARD Off-On switch 18 open and the aircraft at rest, the following conditions exist:

(1) Power is supplied through breaker 25, the top pole of the E.O. switch, the middle pole of the gear selector switch 10, to the Down winding of the motor which is grounded through the bottom pole of switch 10. However, since the microswitch 29b is open due to the gear being fully extended, no current is supplied to the Down winding.

(2) Power is supplied through breaker 24, the bottom pole of the E.O. switch, the bottom pole of press-to-test switch 13 to energize lamp 14 and horn 15 to indicate to the pilot that the GUARD system is Off.

(3) Relay coil 27 is energized due to the gear being down to close right half of sequence system 9.

(4) The gear-down lamp is also energized.

When switch 18 is closed:

(1) Current is supplied to energize relay 8 through breaker 25 to close the E.O. switch thereby breaking the GUARD OFF alarm circuit and the power supply to switch 10.

(2) On closing of the E.O. switch, a circuit is completed through 25 and the top pole of the E.O. switch to the $\alpha$ and $\beta$ sensing units to energize relays 1 and 2 thereby closing their respective switches. This in turn causes energization of relays 3 and 4 to close their respective switches.

(3) Power is then supplied through 25, the top pole of the E.O. switch, the bottom pole of switch 7, the bottom poles of switches 3 and 4 to the press-to-test switch 13. When the latter is actuated by the pilot, circuits are completed to lamps 14, 16 and 17 and to horn 15. If all of these elements are energized, the GUARD system is operating properly.

Taxi

When the engines are started, secondary sensing units $\gamma_1$ and $\gamma_2$ close:

(1) Power is supplied through breaker 24 to the $\gamma_1$ and $\gamma_2$ sensing units to energize relays 5 and 6 to thereby close their respective switches.

(2) Power is supplied through 25, the top pole of the E.O. switch, the top pole of switch 7, the middle poles of switches 5 and 6, the top pole of switch 4, the second from the bottom pole of the E.O. switch and through the motor ground relay to ground. This closes switch 19 to insure isolation of the winding ground line 20 from ground thereby preventing the accidental raising of gear.

Power is also supplied through 25, to the top pole of the E.O. switch, through the top pole of switch 27, to the top pole of gear selector switch 10. If switch 10 is thrown to the Up position, a circuit is completed through the middle pole of switch 13 to energize the gear-down/switch-up lamp 17.

These conditions prevail as the aircraft is taxied.

Takeoff

As the manifold pressures increase above 14 inches of mercury due to the throttles being advanced for takeoff, secondary sensing units $\gamma_1$ and $\gamma_2$ open thereby breaking the circuits to relays 5 and 6. Consequently, the switches associated with these relays open. This breaks the circuit to the motor ground relay. As a result of this function switch 19 opens in preparation for a gear retraction operation.

When a speed of $1.1V_s$ is reached, the primary sensing unit $\alpha$ opens to break the circuit to relay 1. This releases its associated switch to de-energize relay 3 which in turn permits its associated switch to open:

(1) The press-to-test circuit is broken.

(2) Power is supplied through 25, the top pole of the E.O. switch, the top pole of switch 7, the top pole of switch 5 and/or 6, the top pole of switch 3, the second from the top pole of the E.O. switch to the middle pole of the gear selector switch 10:

(a) With switch 10 in the down position, power is still not supplied to the Down winding since switch 29b remains open with the gear extended.

(b) When switch 10 is thrown to the up position, power is supplied to the Up winding through line 11. The Up winding ground line 20 is connected through the top pole of switch 19 and the bottom pole of gear selector switch 10 is ground to complete the gear-up circuit. The gear is thereby retracted.

(3) As sensing units $\gamma_1$ and/or $\gamma_2$ were opened, their respective switches 5 and 6 were thus opened which provided power through the second from the bottom pole of relay 4, through relay 26 coil to ground by way of bottom pole of relay 27, thus closing in turn relay 26. Although relay 27 is de-energized due to retraction of the gear, relay 26 holds itself closed with power through its own lower pole. However, as relay 27 is de-energized by gear retraction, the circuit to the gear-down/switch-up lamp 17 is broken and the light goes out.

(4) To further insure against gear retraction should the aircraft still be on the ground while the above parameters exist, an additional microswitch (not shown) may be provided in the gear-up circuit. This microswitch would be responsive to the weight of the aircraft while on the ground to remain open until the aircraft is airborne. In addition, an angle of attack sensing unit can be provided in parallel to the $\alpha$ sensing unit to preclude gear retraction by keeping relay switch 3 closed until aircraft has flaps retracted, either or both engines developing power, $1.1V_s$ airspeed, and a certain predetermined angle of attack, in order to insure a positive climbing attitude.

(5) When the gear is retracted switch 29b in the Down winding motor circuit closes in preparation for extension of the landing gear.

(6) As the gear reaches its fully up position:

(a) switch 28 closes, but has no immediate effect because of the open top pole of relay 26.

(b) switch 29a opens to disrupt current flow through the Up winding of the motor.

(c) a mis-leading gear-up warning signal is precluded since, as before, relay 26 is maintained in the closed position.

(7) When the speed of the aircraft reaches $1.5V_s$, the primary sensing unit $\beta$ opens to break the circuit to relay 2. This releases its associated switch to de-energize relay 4 which in turn permits its associated switch to open. Consequently, the circuit to relay 26 is broken which closes an alternative press-to-test circuit from 24, through switch 28, top pole of switch 26, either lower poles of relays 5 or 6, and through the lower pole of switch 4 to the press-to-test switch 13. Actuation of switch 13 will once again energize lamps 14, 16, and 17, and horn to indicate to the pilot the operability of the guard system. Power is maintained at the middle pole of switch 10.

Reduced power landing

Regardless of airspeed, if either, or both, of the engines is cut back such that the manifold pressure falls below 14 inches of mercury, the corresponding secondary sensing unit $\gamma_1$ and/or $\gamma_2$ closes to appropriately cause closure of its associated switches 5 and/or 6. When this occurs a circuit to the gear-up lamp 16 is completed. This circuit is through 24, switch 28, top pole of switch 26, bottom pole of relay switch 5 and/or 6, top pole of switch 13 to lamp 16.

If only one of the switches 5 or 6 closes, power to the gear selector switch is maintained in the manner previously described. However, if both switches are closed, the original circuit is disrupted and an alternative circuit is completed. This circuit is through 25, the top pole of the E.O. switch, the top pole of switch 7, the middle poles of switches 5 and 6, the top pole of switch 4, the second from the top pole of the E.O. switch to the middle pole of switch 10.

With both switches 5 and 6 closed, the alternative press-to-test circuit is broken.

Regardless of the manifold pressure on the engines, if the air speed falls below $1.5V_s$, primary sensing unit $\beta$ closes to cause closure of switch 4. A circuit is then completed through 24, switch 28, top pole of switch 26, second from the top pole of switch 4, the top pole of switch 13 to the gear-up lamp 16. As long as one of switches 5 or 6 remains open, the gear selector switch 10 will be supplied with power.

If the manifold pressures of both engines fall below 14 inches of mercury and the air speed falls below $1.5V_s$:

(1) The gear-up lamp 16 remains energized by the circuit just described and by another circuit through 24, switch 28, top pole of switch 26, the second from the top pole of switch 4, the top pole of switch 13 to lamp 16.

(2) The alternative circuit to the gear selector circuit 10 is disrupted due to the opening of the top pole of switch 4. Accordingly, no power is supplied to the middle pole of switch 10.

(3) An automatic gear-down circuit is completed through 25, the top pole of the E.O. switch, the top pole of switch 7, the middle poles of switches 5 and 6, the top pole of switch 4, the second from the bottom pole of the E.O. switch and through the motor ground relay. Energization of this relay closes switch 19 to complete the automatic circuit through the bottom pole of switch 19, line 12, the Down winding of the motor, line 21, the top pole of switch 19 and the bottom pole of switch 10. Thus, the gear automatically extends even though the gear selector switch 10 is in the up position.

(a) As the gear extends, switch 28 opens to break the circuits to the gear-up lamp 16.

(b) Switch 29a closes in preparation for the next gear-up operation.

(c) When the gear is fully down, relay 27 is energized and the gear-down lamp is illuminated. Energization of relay 27 closes switch 27 to again complete the previously described circuit through breaker 25, the E.O. switch, and switches 27, 10, 13 to the gear-down/switch-up lamp 17.

(d) With the gear fully down, switch 29b also opens to disrupt current in the Down winding.

(4) As the speed of the aircraft falls below $1.1V_s$, the primary sensing unit $\alpha$ closes causing closure of switch 3. Consequently, the circuit through 25, E.O. switch, switch 7, switch 3 and switch 4 is completed to switch 13 thereby permitting the press-to-test function.

(5) The landing gear can be manually extended at any time prior to the condition when the $\gamma_1$, $\gamma_2$ and $\beta$ sensing units close by throwing the gear selector switch to the down position. After automatic extension of the gear has begun, the moving of switch 10 to the down position has no effect on automatic operation except to break the above-described circuit to the gear-down switch-up lamp 17.

Power approach to landing

To preclude gear-up landings under conditions where approach to landing is made with the engines developing more power than 14 inches of mercury, as for example in a short field landing, the secondary sensing unit $\Delta$ is employed. As the air speed falls below $1.5V_s$, switch 4 is closed to complete the previously described alternative circuit to the gear-up lamp 17. Power is still applied to the gear selector switch 10 as set forth hereinbefore. As the flaps are extended to their full down position (or other convenient, predetermined position), the secondary sensing unit $\Delta$ closes. This completes a circuit through breaker 23 and the $\Delta$ sensing unit to energize relay 7 and the flaps-down lamp. Energization of relay 7 closes its associated switch to break the supply path to selector switch 10 and to complete the automatic gear-down circuit by by-passing switches 5 and 6. The remaining portion of the landing operation is the same as set forth with reference to the Reduced Power Landing description.

Landing rollout

Since the supply circuit to the gear selector switch 10 is disrupted in both the Reduced Power Landing and the Power Approach, as previously described, there is no chance of inadvertant gear retraction during landing rollout. To further insure this, as the speed of the aircraft falls below $1.1V_s$, switch 3 is closed to further break the principal gear-up circuit.

Emergency override

In any instance, should a situation arise which results in a potential emergency, the Emergency Override switch can be used to restore normal gear system circuitry. This is accomplished by opening switch 18 to deenergize relay 8. This results in the release of the E.O. switch to the position shown in the drawings by which the previously described direct circuits to the gear selector switch and to lamp 14 and horn 15 are completed. The pilot may then operate the gear manually by suitable actuation of the gear selector switch 10.

Fail safe design

Based on the foregoing, it is obvious that the GUARD system provides an improved safety arrangement for the control of the retractable landing gear mechanism. The GUARD system includes a press-to-test feature which permits the pilot to check the operability of the system before takeoff and before landing.

The foregoing detailed description of the circuits, taken in conjunction with the drawing, indicate that in case of failure of an individual element which results in the inability of the GUARD system to perform a prescribed function, suitable warning circuits are completed to indicate to the pilot the condition which exists so that he may, as a final resort, convert to a manual back-up system.

If at any time, the α sensing unit, or time delay relay 1 or gear-up relay 3 fails, each component is so designed that the final result allows relay 3 to remain open thus permitting normal gear traction on takeoff when the engines are developing more than 12 inches of mercury manifold pressure power and the flaps are retracted. Also, if this situation occurs in flight, electrical current is also available for extension of the landing gear. If relays 5 and 6 are closed due to low manifold pressure sensing of the $\gamma_1$ and $\gamma_2$ units, then the β sensing unit will function normally to lower the landing gear automatically when the indicated air speed decreases below $1.5V_s$.

Should failure of the β sensing system occur which would render gear-down relay 4 inoperative (open up), the system is so designed that the gear will not be extended automatically, which thus precludes an undesired gear-down condition in the event that some co-existent in-flight emergency takes place. This also eliminates the possibility of gear door damage due to automatic gear extension above placarded air speed limit.

In summary, the GUARD control system has been designed so that it is readily adaptable to any and all types of aircraft and/or spacecraft equipped with retractable landing gear mechanism by utilization of various combinations of sensing units dictated by the configuration and operational components of the vehicle as well as its flight parameters. The GUARD system may be equally adapted to gear systems utilizing hydraulic or pneumatic power for actuating the landing gear mechanism and to other mechanical systems.

The above-described embodiment is illustrative of a preferred embodiment of the invention but is not intended to limit the possibilities of insuring the features of an improved, safe Gear Up Automatic Responsive Device. The circuit illustrated may be expanded, for example, to include additional relay circuitry in the path to switch 18. This additional circuitry would be connected to the main power source to permit the energization of lamp 14 regardless of whether circuit breaker 25 or the larger circuit breaker 24 opens. The GUARD system disclosed herein is an example of an arrangement in which the inventive features of this disclosure may be utilized, and it will become apparent to one skilled in the art that certain modifications may be made within the spirit of the invention as defined by the appended claims.

I claim:

1. A landing gear system for use on an air or space vehicle employing a retractable landing gear comprising: a power source, a gear selector switch for said landing gear, said switch having gear-up and gear-down positions, and control means for selectively connecting said power source to retracting and extending means for said landing gear through said gear selector switch; a plurality of sensing means each monitoring a separate one of at least three flight conditions of said vehicle, each sensing means being operatively related to said control means; said control means including a first switching means connected to one of said sensing means for actuation thereby and additional switching means operatively connected to the remaining sensing means; said first switching means and the additional switching means being actuated in response, respectively, to a pre-determined value of the condition sensed by said first sensing means and a pre-determined value of at least one of the remaining conditions to complete a path to the gear extending means, regardless of the position of said gear selector switch.

2. A landing gear system for use on an air or space vehicle employing a retractable landing gear comprising: a power source, a gear selector switch for said landing gear, said switch having gear-up and gear-down positions, and control means for selectively connecting said power source to retracting and extending means for said landing gear through said gear selector switch; a plurality of sensing means each monitoring a separate one of at least three flight conditions of said vehicle, each sensing means being operatively related to said control means; said control means including a first switching means connected to one of said sensing means for actuation thereby, said first switching means normally interrupting a path between the power supply and the gear retracting means until said selector is in the gear-up position and said one sensing means responds to a pre-determined value of its sensed condition to actuate said first switching means to complete said path; said control means further comprising additional switching means operatively connected to each of said sensing means; said additional switching means being actuated in response to pre-determined values of the condition sensed by said first sensing means and at least one of the remaining conditions to complete a path to the gear extending means, regardless of the position of said selector switch.

3. A landing gear system as set forth in claim 1 further comprising: means for selectively disabling said control means to permit conventional manual operation of said landing gear in response to the position of said selector switch.

4. A landing gear system as set forth in claim 3 further comprising: indicating means operatively related to said disabling means to indicate that the control means is disabled.

5. A landing gear system as set forth in claim 1 further comprising: indicating means operatively related to said control means to indicate whether said control means is operating properly.

6. A landing gear system as set forth in claim 1 further comprising: indicator means operatively related to said control means to indicate in response to particular sensed flight conditions the position of said landing gear and said selector switch.

References Cited by the Examiner

UNITED STATES PATENTS

| | | | |
|---|---|---|---|
| 2,112,253 | 3/1938 | Smith | 244—102 |
| 2,115,701 | 5/1938 | Baer et al. | 244—102 |
| 2,316,682 | 4/1943 | Finnegan | 244—102 |
| 2,331,108 | 10/1943 | DeGanahl | 244—102 |
| 2,580,452 | 1/1952 | Miller | 244—102 |

FERGUS S. MIDDLETON, *Primary Examiner.*

MILTON BUCHLER, *Examiner.*